(12) United States Patent
Linde (10) Patent No.: US 11,518,535 B2
(45) Date of Patent: Dec. 6, 2022

(54) NACELLE COWL DEFLECTION LIMITER

(71) Applicant: Rohr, Inc., Chula Vista, CA (US)

(72) Inventor: Erik Linde, Coronado, CA (US)

(73) Assignee: Rohr, Inc., Chula Vista, CA (US)

( * ) Notice: Subject to any disclaimer, the term of this patent is extended or adjusted under 35 U.S.C. 154(b) by 130 days.

(21) Appl. No.: 17/036,699

(22) Filed: Sep. 29, 2020

(65) Prior Publication Data

US 2021/0095577 A1 Apr. 1, 2021

Related U.S. Application Data

(60) Provisional application No. 62/907,988, filed on Sep. 30, 2019.

(51) Int. Cl.
| | | |
|---|---|---|
| *B64D 29/00* | (2006.01) | |
| *B64D 29/06* | (2006.01) | |
| *F01D 25/24* | (2006.01) | |
| *F02K 1/82* | (2006.01) | |
| *B64D 27/10* | (2006.01) | |
| *B64D 29/08* | (2006.01) | |
| *F02C 7/20* | (2006.01) | |

(52) U.S. Cl.
CPC ............. *B64D 29/00* (2013.01); *B64D 29/06* (2013.01); *F01D 25/24* (2013.01); *F02K 1/822* (2013.01); *B64D 27/10* (2013.01); *B64D 29/08* (2013.01); *F02C 7/20* (2013.01); *F05D 2260/30* (2013.01)

(58) Field of Classification Search
CPC ........ B64D 29/00; B64D 29/06; B64D 27/10; B64D 29/08; B64D 2033/024; B64D 33/04; F01D 25/24; F01D 25/30; F02C 7/20; F02C 7/18; F05D 2260/30; Y02T 50/60; F02K 1/38
See application file for complete search history.

(56) References Cited

U.S. PATENT DOCUMENTS

| | | | | |
|---|---|---|---|---|
| 4,571,936 A | * | 2/1986 | Nash ........................ | F02C 7/20 244/54 |
| 8,464,541 B2 | | 6/2013 | Andre | |
| 10,294,863 B2 | | 5/2019 | Ronan | |
| 2007/0245739 A1 | | 10/2007 | Stretton | |
| 2010/0024435 A1 | * | 2/2010 | Vauchel ................. | B64D 29/08 244/54 |
| 2011/0214747 A1 | * | 9/2011 | Le Docte ............... | B64D 33/04 137/15.1 |

(Continued)

OTHER PUBLICATIONS

EP search report for EP20199399.5 dated Feb. 19, 2021.

*Primary Examiner* — Gerald L Sung
*Assistant Examiner* — Rene D Ford
(74) *Attorney, Agent, or Firm* — Getz Balich LLC (57) ABSTRACT

An assembly is provided for an aircraft propulsion system. This assembly includes a nacelle inner structure and a deflection limiter. The nacelle inner structure includes an internal compartment and a cowl. The internal compartment is configured to house a core of a gas turbine engine. The cowl is configured to form an outer radial periphery of the internal compartment. The cowl is also configured to form an outer radial periphery of a compartment exhaust to the internal compartment at an aft end of the cowl. The deflection limiter is attached to the cowl. The deflection limiter is configured to limit radial outward movement of the cowl.

20 Claims, 10 Drawing Sheets

(56) References Cited

U.S. PATENT DOCUMENTS

| | | | |
|---|---|---|---|
| 2012/0111995 A1* | 5/2012 | Lafont | B64D 27/18 244/54 |
| 2013/0227952 A1* | 9/2013 | Grip | F01D 25/26 60/770 |
| 2013/0236294 A1 | 9/2013 | Vauchel | |
| 2014/0318149 A1* | 10/2014 | Guillon | F02C 7/25 277/597 |
| 2016/0032779 A1* | 2/2016 | Sawyers-Abbott | F01D 25/246 60/805 |
| 2016/0032863 A1* | 2/2016 | Malot | F02K 3/072 415/213.1 |
| 2016/0047274 A1 | 2/2016 | Woolworth | |
| 2016/0053719 A1* | 2/2016 | Pretty | B64D 29/00 239/265.19 |
| 2016/0376995 A1* | 12/2016 | Ronan | B64D 33/04 415/215.1 |
| 2017/0009599 A1 | 1/2017 | Dahmen | |
| 2017/0204807 A1 | 7/2017 | Chillapalli | |
| 2019/0055026 A1 | 2/2019 | Sawyers-Abbott | |
| 2019/0301305 A1* | 10/2019 | Pretty | F01D 25/265 |
| 2019/0383172 A1* | 12/2019 | Gaches | F02K 3/06 |

* cited by examiner

NACELLE COWL DEFLECTION LIMITER

CROSS-REFERENCE TO RELATED APPLICATIONS

This application claims priority to U.S. Provisional Patent Application No. 62/907,988 filed Sep. 30, 2019, which is hereby incorporated herein by reference in its entirety.

BACKGROUND

1. Technical Field

This disclosure relates generally to an aircraft propulsion system and, more particularly, to a pressure relief system for an internal compartment within the aircraft propulsion system.

2. Background Information

Figure 9:
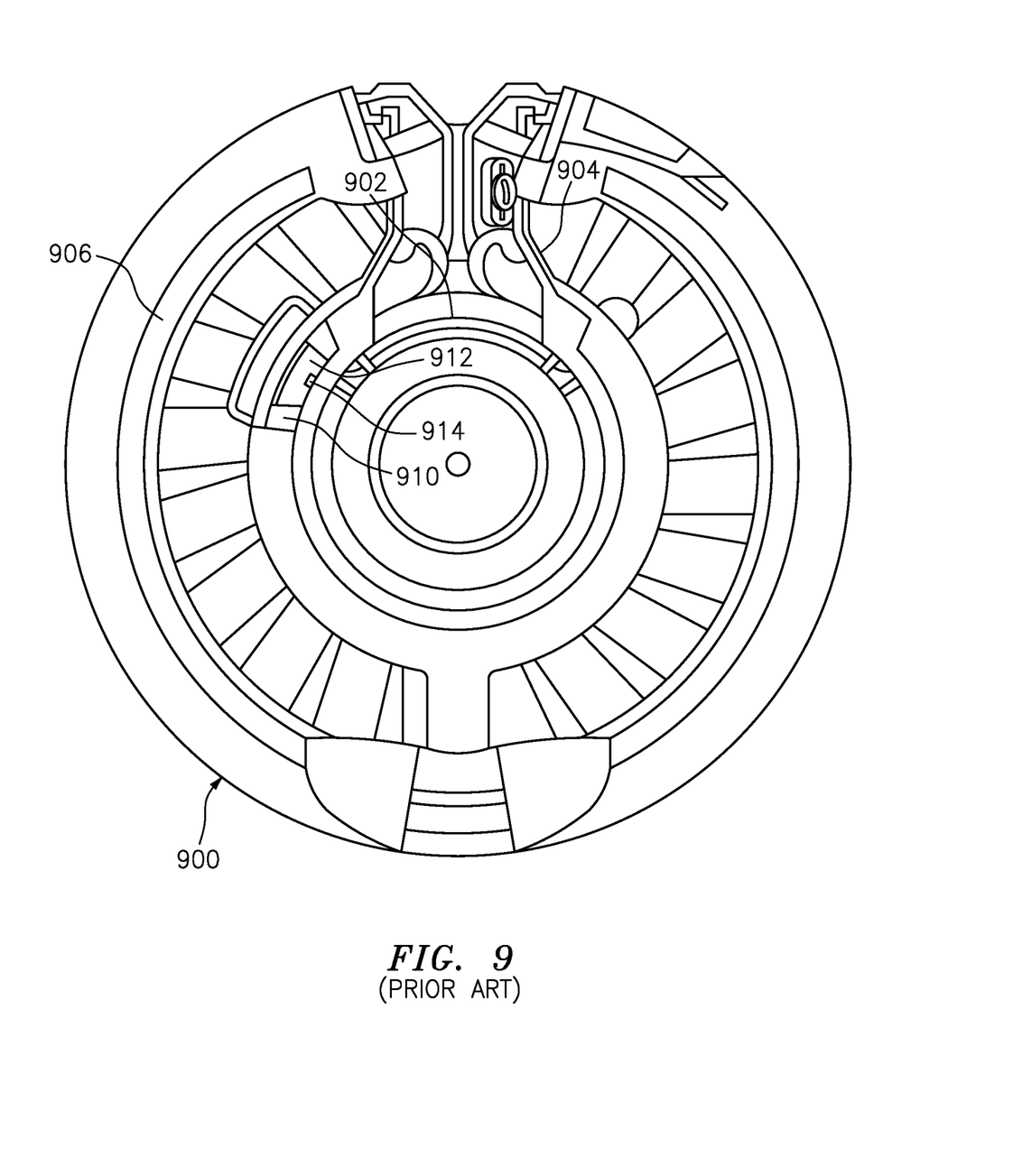
FIG. 9 is an illustration of a prior art engine nacelle.

U.S. Patent Application Publication No. 2017/0009599 discloses a pressure relief door assembly. Referring to FIG. 9, an engine nacelle 900 includes an engine assembly 902, an inner fixed structure 904 and an outer structure 906 that surrounds the inner fixed structure 904. The inner fixed structure 904 forms an aerodynamic fairing around and provides a pressure relief door frame 910 for the engine assembly 902 and multiple compressed air ducts associated with the engine assembly 902, along with several other auxiliary components, tubes, wire harnesses, etc.

Figure 10:
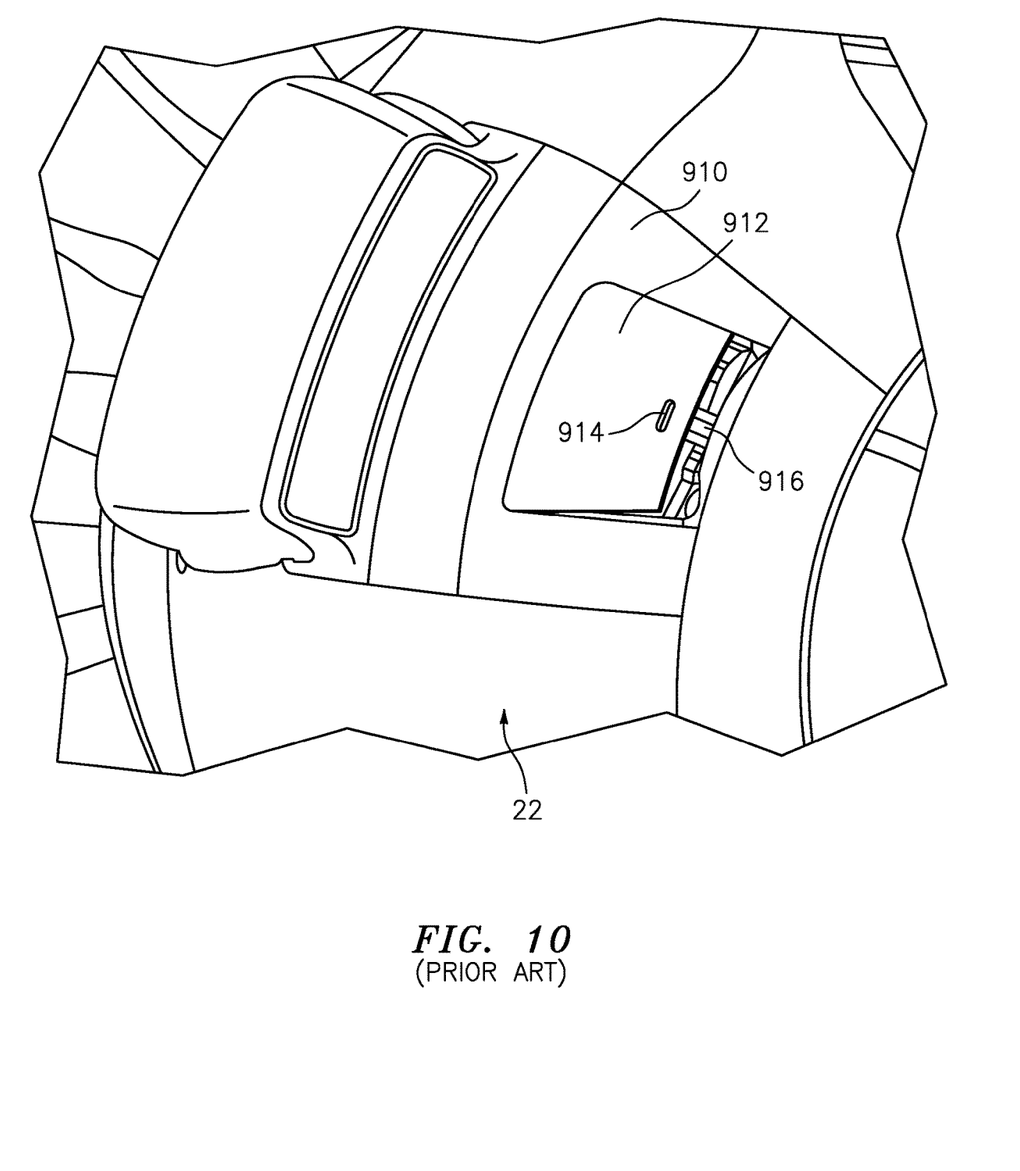
FIG. 10 is an enlarged illustration of the engine nacelle of FIG. 9.

The outer structure 906 provides a generally annular element with an aerodynamic taper that narrows toward the trailing end of the engine nacelle 900. The inner fixed structure 904 includes the engine pressure relief door frame 910, a pressure relief door 912 that is hinge-coupled to the engine pressure relief door frame 910, and a latch element 914. The engine pressure relief door frame 910 can serve as a frame for the pressure relief door 912 that attaches to the inner fixed structure 904 (i.e., a housing) or, in some cases, the pressure relief door 912 can include a door and a hinge that attaches directly to the inner fixed structure 904. The latch element 914 may include a spring-loaded element 916 (see FIG. 10) and is configured to normally remain in a latched condition to thereby maintain the pressure relief door 912 in a closed condition. However, the latch element 914 may also assume an unlatched condition to thereby permit the pressure relief door 912 to assume an open condition in accordance with an occurrence of a burst duct event in any one or more of multiple ducts to relieve excess pressures.

There is a need in the art for an improved systems and methods for preventing structural damage in the event of a highly-pressurized duct burst.

SUMMARY OF THE DISCLOSURE

According to an aspect of the present disclosure, an assembly is provided for an aircraft propulsion system. This aircraft propulsion system assembly includes a nacelle inner structure and a deflection limiter. The nacelle inner structure includes an internal compartment and a cowl. The internal compartment is configured to house a core of a gas turbine engine. The cowl is configured to form an outer radial periphery of the internal compartment. The cowl is also configured to form an outer radial periphery of a compartment exhaust to the internal compartment at an aft end of the cowl. The deflection limiter is attached to the cowl. The deflection limiter is configured to limit radial outward movement of the cowl.

According to another aspect of the present disclosure, another assembly is provided for an aircraft propulsion system. This aircraft propulsion system assembly includes a nacelle inner structure and a deflection limiter. The nacelle inner structure includes an internal compartment and a cowl. The internal compartment is configured to house a core of a gas turbine engine. The cowl extends circumferentially about and axially along the internal compartment. The cowl is configured to at least partially form a compartment exhaust for the internal compartment. The deflection limiter is attached to the cowl. The deflection limiter is configured to enable a predefined amount of radial deflection of the cowl.

According to still another aspect of the present disclosure, another assembly is provided for an aircraft propulsion system. This aircraft propulsion system assembly includes a nacelle inner structure, a gas turbine engine and a deflection limiter. The nacelle inner structure includes an internal compartment and a cowl. The cowl is configured to at least partially form a compartment exhaust for the internal compartment. The compartment exhaust is configured to direct fluid out of the internal compartment into an environment outside of the aircraft propulsion system. The gas turbine engine includes an engine core housed within the internal compartment. The deflection limiter is attached to the cowl and a fixed structure of the assembly. The deflection limiter is configured to control deflection of the cowl at least at the compartment exhaust.

The deflection limiter may be arranged at the compartment exhaust.

The aircraft propulsion system assembly may also include the gas turbine engine. The deflection limiter may be attached to a fixed structure of the gas turbine engine.

The deflection limiter may extend radially between an inner end and an outer end. The deflection limiter may include an inner mounting aperture at the inner end and an outer mounting aperture at the outer end. A first fastener may be mated with the inner mounting aperture and may attach the deflection limiter to a fixed structure. The fixed structure may be arranged radially inward of and axially overlapped by the cowl. A second fastener may be mated with the outer mounting aperture and may attach the deflection limiter to the cowl.

The deflection limiter may be configured as or otherwise include a variable length apparatus.

The deflection limiter may be configured as or otherwise include a fixed length apparatus.

The deflection limiter may be configured to limit radial outward movement of the cowl at the aft end of the cowl.

The deflection limiter may be configured to enable a predefined amount of radial movement of the cowl.

The aircraft propulsion system assembly may also include the gas turbine engine. The deflection limiter may be attached to and extend radially between the cowl and a case of the core of the gas turbine engine.

The deflection limiter may extend radially between an inner end and an outer end. The deflection limiter may include a mounting aperture at the outer end. A fastener may be mated with the mounting aperture to attach the deflection limiter to the cowl.

The mounting aperture may be configured as or otherwise include a slot. The fastener may be configured to move laterally within the slot.

The deflection limiter may extend radially between an inner end and an outer end. The deflection limiter may include a mounting aperture at the inner end. A fastener may be mated with the mounting aperture. The fastener may be configured to attach the deflection limiter to a fixed structure located radially inboard of the cowl.

The deflection limiter may be configured as or otherwise include a turnbuckle.

The deflection limiter may be configured as or otherwise include a damper.

The compartment exhaust may be configured to direct fluid out of the internal compartment into an environment outside of the nacelle inner structure.

The aircraft propulsion system assembly may also include a core nozzle configured to form an inner radial periphery of the compartment exhaust and to form an outer radial periphery of a core exhaust.

The cowl is may also be configured to form an inner radial periphery of a bypass flowpath within the aircraft propulsion system.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
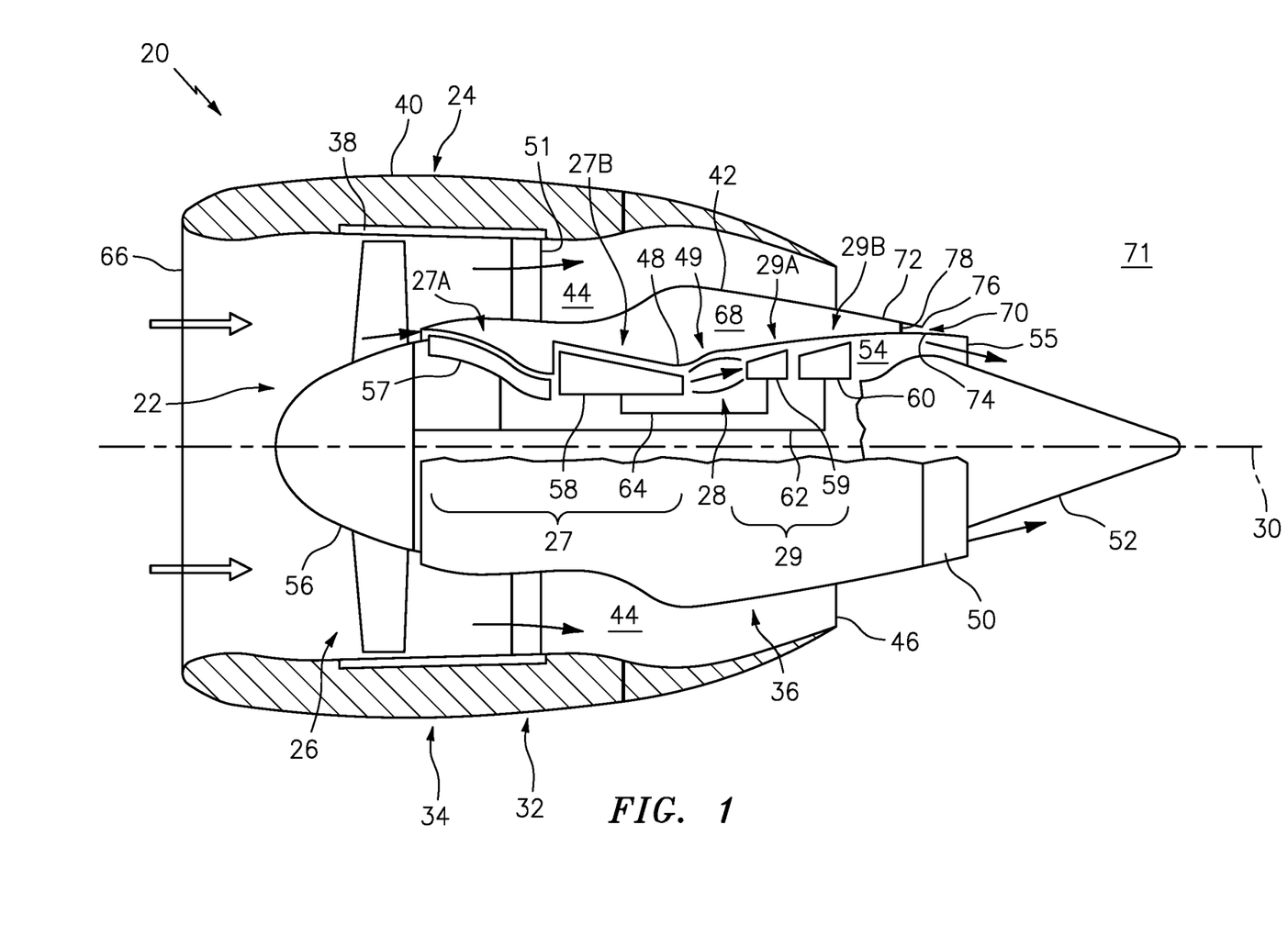
FIG. 1 is a schematic side cutaway illustration of an aircraft propulsion system.

FIG. 1 illustrates an aircraft propulsion system 20 for an aircraft such as, but not limited to, a commercial airliner or cargo plane. The aircraft propulsion system 20 includes a gas turbine engine 22 and a nacelle 24.

The gas turbine engine 22 may be configured as a high-bypass turbofan engine. The gas turbine engine 22 of FIG. 1, for example, includes a fan section 26, a compressor section 27, a combustor section 28 and a turbine section 29. The compressor section 27 may include a low pressure compressor (LPC) section 27A and a high pressure compressor (HPC) section 27B. The turbine section 29 may include a high pressure turbine (HPT) section 29A and a low pressure turbine (LPT) section 29B.

The engine sections 26-29B are arranged sequentially along an axial centerline 30 (e.g., a rotational axis) of the gas turbine engine 22 within an aircraft propulsion system housing 32. This housing 32 includes an outer housing structure 34 and an inner housing structure 36.

The outer housing structure 34 includes an outer case 38 (e.g., a fan case) and an outer structure 40 of the nacelle 24; i.e., a nacelle outer structure. The outer case 38 houses at least the fan section 26.

The nacelle outer structure 40 houses and provides an aerodynamic cover for the outer case 38. The nacelle outer structure 40 also covers a forward portion of an inner structure 42 of the nacelle 24; i.e., a nacelle inner structure, which may also be referred to as an inner fixed structure. More particularly, the nacelle outer structure 40 axially overlaps and extends circumferentially about (e.g., completely around) the nacelle inner structure 42. The nacelle outer structure 40 and the nacelle inner structure 42 thereby at least partially or completely form a bypass flow path 44. This bypass flow path 44 extends axially along the centerline 30 within the aircraft propulsion system 20 to a bypass exhaust 46 (e.g., a bypass nozzle outlet), where the bypass flow path 44 is radially between the nacelle structures 34 and 36.

The inner housing structure 36 includes an inner case 48 (e.g., a core case) and the nacelle inner structure 42. The inner case 48 houses one or more of the engine sections 27A-29B, which engine sections 27A-29B may be collectively referred to as a core 49 of the gas turbine engine 22. The inner case 48 and/or, more generally, the inner housing structure 36 may be connected to the outer case 38 and/or, more generally, the outer housing structure 34 by one or more supports 51 (e.g., guide vanes, struts, etc.), which supports 51 extend radially between the cases 48 and 38 to support the outer housing structure 34 and its outer case 38.

The nacelle inner structure 42 houses and provides an aerodynamic cover for the inner case 48. A downstream/aft portion of the inner housing structure 36 such as, for example, a core nozzle 50 of the nacelle inner structure 42 also covers at least a portion of an exhaust center body 52. More particularly, the nacelle inner structure 42 and its core nozzle 50 axially overlap and extend circumferentially about (e.g., completely around) the exhaust center body 52. The core nozzle 50 and the exhaust center body 52 thereby collectively form a downstream/aft portion of a core flow path 54. This core flow path 54 extends axially within the aircraft propulsion system 20, through the engine sections 27A-29B, to a core exhaust 55 (e.g., a core nozzle outlet) at a downstream/aft end of the aircraft propulsion system 20.

Each of the engine sections 26, 27A, 27B, 29A and 29B of FIG. 1 includes a respective rotor 56-60. Each of these rotors 56-60 includes a plurality of rotor blades arranged circumferentially around and connected to one or more respective rotor disks.

The fan rotor 56 and the LPC rotor 57 are connected to and driven by the LPT rotor 60 through a low speed shaft 62. The HPC rotor 58 is connected to and driven by the HPT rotor 59 through a high speed shaft 64. The shafts 62 and 64 are rotatably supported by a plurality of bearings (not shown). Each of these bearings is connected to the aircraft propulsion system housing 32 by at least one stationary structure such as, for example, an annular support strut.

During operation, air enters the aircraft propulsion system 20 through an airflow inlet 66. This air is directed through the fan section 26 and into the core flow path 54 and the bypass flow path 44. The air within the core flow path 54 may be referred to as "core air". The air within the bypass flow path 44 may be referred to as "bypass air".

The core air is compressed by the compressor rotors 57 and 58 and directed into a combustion chamber of a combustor in the combustor section 28. Fuel is injected into the combustion chamber and mixed with the compressed core air to provide a fuel-air mixture. This fuel air mixture is ignited and combustion products thereof flow through and sequentially cause the turbine rotors 59 and 60 to rotate. The rotation of the turbine rotors 59 and 60 respectively drive rotation of the compressor rotors 58 and 57 and, thus, compression of the air received from a core airflow inlet. The rotation of the turbine rotor 60 also drives rotation of the fan rotor 56, which propels bypass air through and out of the bypass flow path 44. The propulsion of the bypass air may account for a majority of thrust generated by the turbine engine 22, e.g., more than seventy-five percent (75%) of engine thrust. The aircraft propulsion system 20 of the present disclosure, however, is not limited to the foregoing exemplary thrust ratio. Furthermore, the aircraft propulsion system 20 of the present disclosure is not limited to the exemplary gas turbine engine configuration described above.

To cool components (e.g., auxiliary components) configured with and/or attached to the engine core 49 and its inner case 48, cooling fluid may be directed into an internal compartment 68 (e.g., a core compartment) of the inner housing structure 36 and its nacelle inner structure 42. The cooling fluid may be gas (e.g., compressed air) bleed from the bypass flow path 44 and/or the core flow path 54 forward of the combustor section 28. After cooling the components, the cooling fluid may be exhausted/expelled from the internal compartment 68 through an internal compartment exhaust 70 (e.g., a compartment nozzle outlet) for the internal compartment 68 and into an environment 71 outside of the aircraft propulsion system 20.

The compartment exhaust 70 of FIG. 1 is formed by and extends radially between a core cowl 72 of the nacelle inner structure 42 and a fixed structure 74, which may be configured as or positioned axially next to the core nozzle 50. Thus, the core cowl 72 at least partially or completely forms an outer radial periphery of the compartment exhaust 70 at (e.g., on, adjacent or proximate) an aft end 76 of the core cowl 72. The fixed structure 74 of FIG. 1 at least partially or completely forms an inner radial periphery of the compartment exhaust 70.

The core cowl 72 may be configured to flex, deflect and/or otherwise move such that a cross-sectional area of the compartment exhaust 70 (e.g., when viewed in a plane perpendicular to the axial centerline 30) can change (e.g., increase, decrease) in order to accommodate changing mass flows of the fluid being exhausted from the internal compartment 68. For example, under a burst duct condition, the cowl core 72 is configured to flex, deflect and/or otherwise move radially outward (e.g., away form the axial centerline 30) to enable additional fluid to flow through the compartment exhaust 70. This may enable the compartment exhaust 70 to accommodate the additional mass flow of fluid into the internal compartment 68 without causing additional damage to the nacelle inner structure 36. However, to prevent the core cowl 72 from over flexing, deflecting and/or otherwise moving in a radial outward direction, the aircraft propulsion system 20 is configured with one or more deflection limiters 78; e.g., waiting failsafe deflection limiters.

Figure 2:
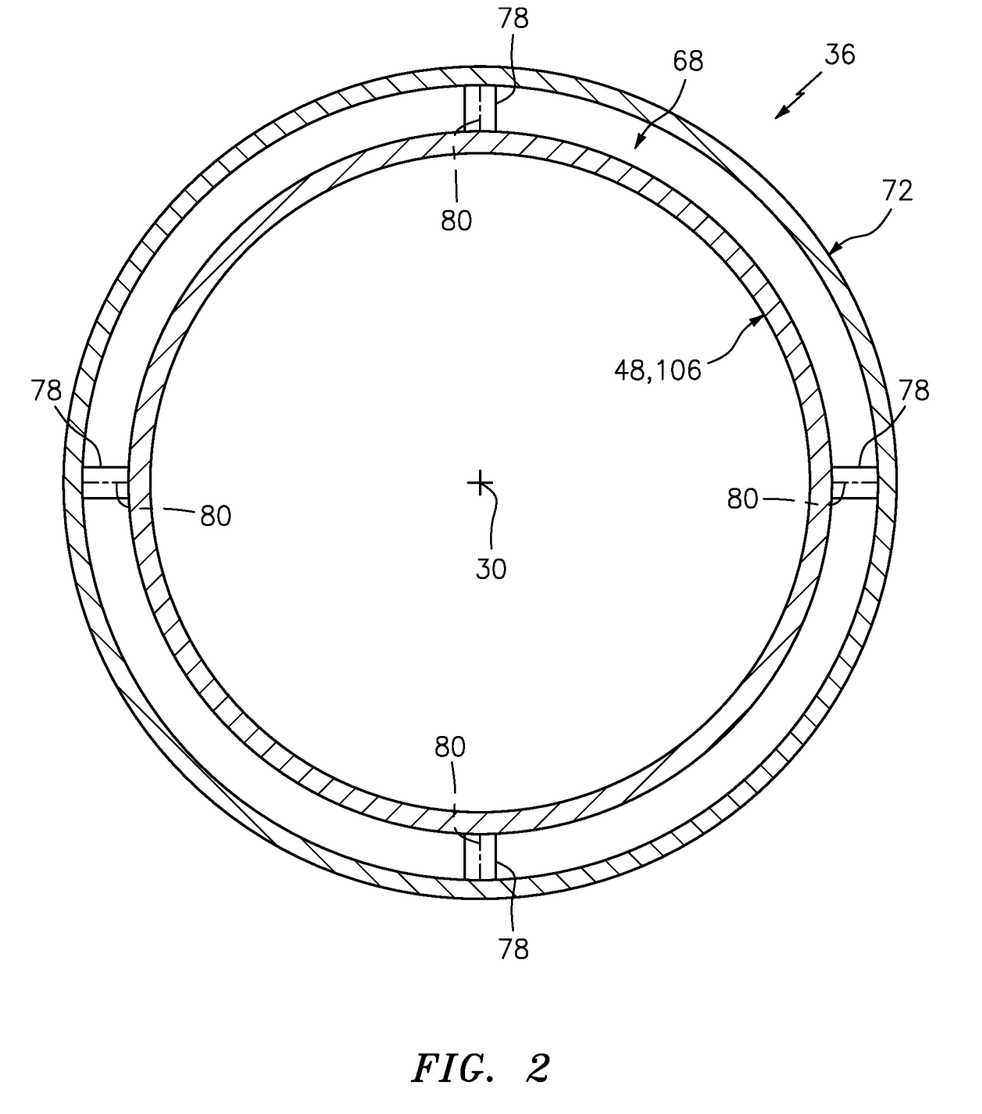
FIG. 2 is a schematic cross-sectional illustration of a portion of an inner housing structure.
Figure 3A:
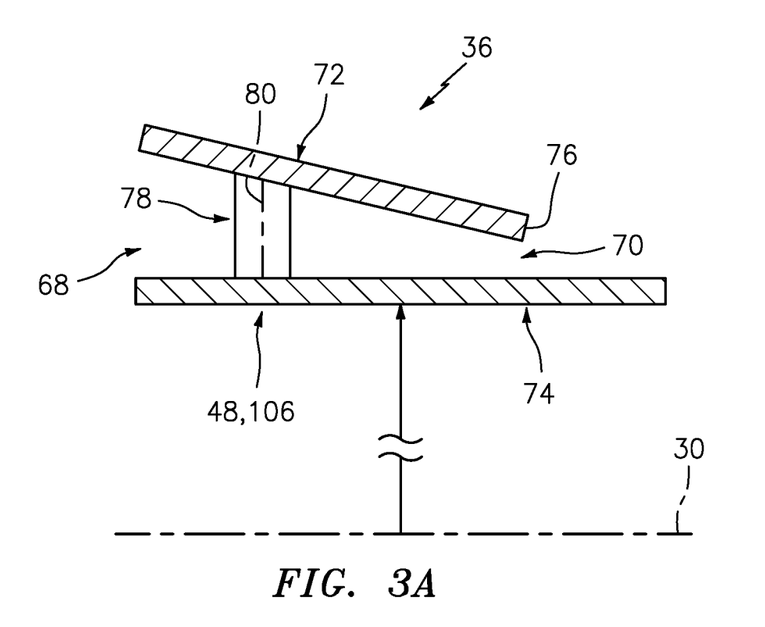
FIG. 3A is a schematic side sectional illustration of a portion of the inner housing structure under a first set of conditions.
Figure 3B:
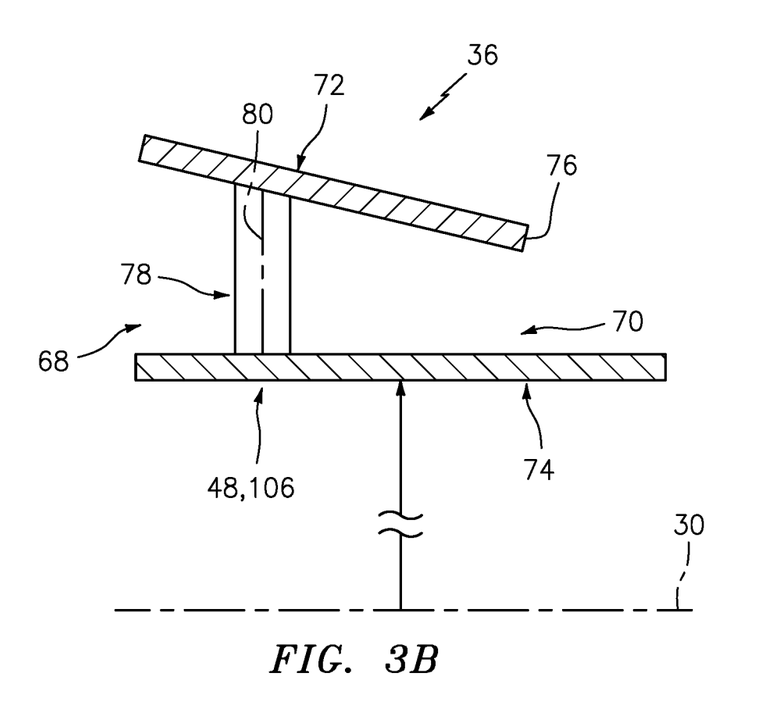
FIG. 3B is a schematic side sectional illustration of a portion of the inner housing structure under a second set of conditions.

Referring to FIG. 2, the deflection limiters 78 may be arranged at discrete locations about the axial centerline 30 in an annular array. Referring to FIGS. 3A and 3B, each of the deflection limiters 78 is configured to enable a predetermined amount of radial movement of the core cowl 72. For example, each deflection limiter 78 may enable at least a portion of the core cowl 72 at (e.g., on, adjacent or proximate) its aft end 76 to move radially between a radial inner position (see FIG. 3A) and a radial outer position (see FIG. 3B). The core cowl 72 may be arranged in the inner position of FIG. 3A during normal operation. The core cowl 72 may be arranged in the outer position of FIG. 3B during, for example, abnormal operation; e.g., during a burst duct condition. However, while the deflection limiters 78 may enable the foregoing radial movement between the inner and the outer positions, one or more or each deflection limiter 78 is also configured to limit radial movement of the core cowl 72. For example, each deflection limiter 78 may be configured to prevent the core cowl 72 from moving radially inward from the inner position of FIG. 3A. Thus, the deflection limiters 78 may prevent over flexing, deflecting and/or otherwise moving in a radial inward direction which may overly restrict or close the compartment exhaust 70. Each deflection limiter 78 may also or alternatively be configured to prevent the core cowl 72 from moving radially outward from the outer position of FIG. 3B. Thus, the deflection limiters 78 may prevent over flexing, deflecting and/or otherwise moving in a radial outward direction which may cause, for example, damage to the core cowl 72 and/or the nacelle inner structure 36 as a whole.

Figure 4:
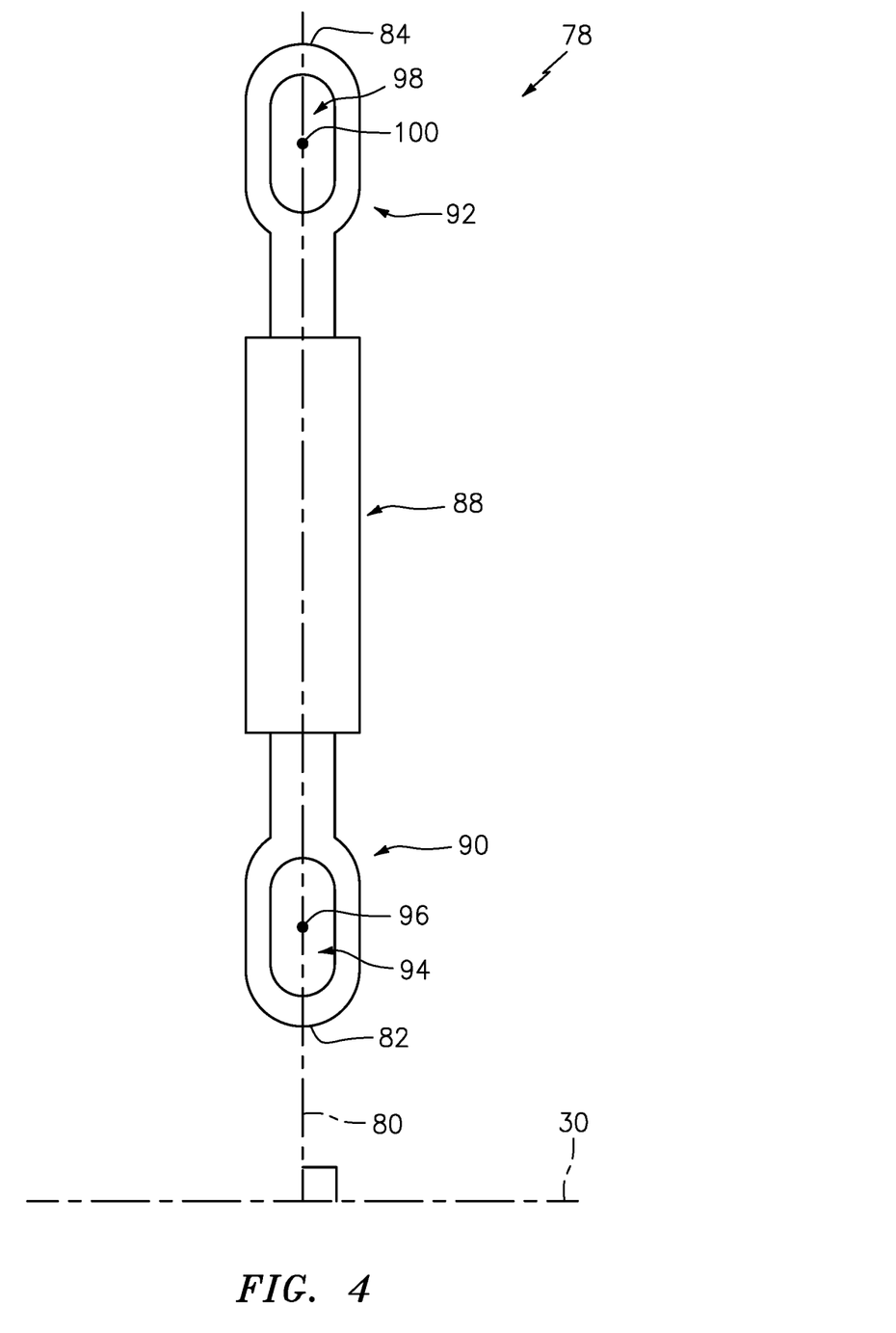
FIG. 4 is an illustration of a deflection limiter at a first orientation.
Figure 5:
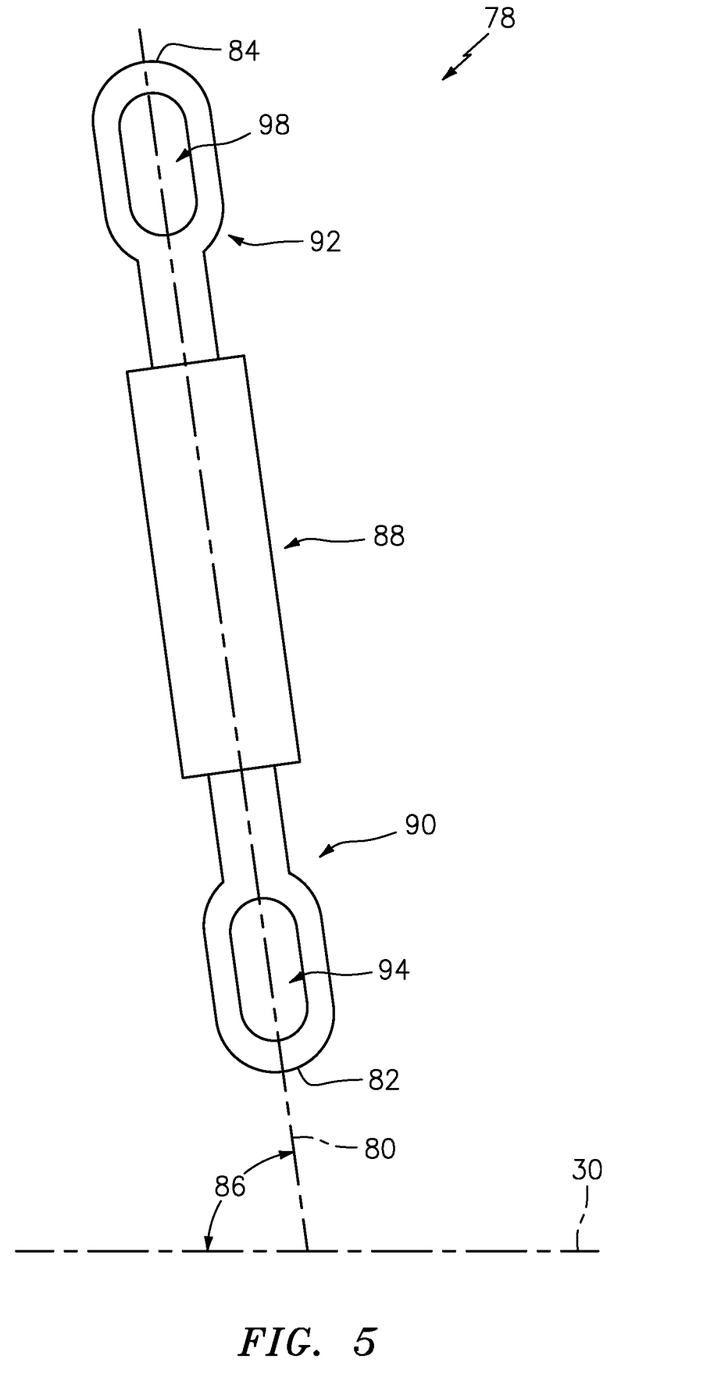
FIG. 5 is an illustration of the deflection limiter at a second orientation.

FIG. 4 illustrates an exemplary one of the deflection limiters 78. This deflection limiter 78 extends longitudinally along a longitudinal centerline 80 of the limiter 78 between a deflection limiter inner end 82 and a deflection limiter outer end 84. Note, when arranged in the aircraft propulsion system 20 of FIG. 1, the longitudinal centerline 80 may be substantially or completely radial (e.g., perpendicular) relative to the axial centerline 30 as shown in FIG. 4. The present disclosure, however, is not limited to such an exemplary orientation. For example, in the embodiment of FIG. 5, the longitudinal centerline 80 is angularly offset (forward or backwards) from the axial centerline 30 by an acute angle 86.

The deflection limiter 78 of FIG. 4 includes a base 88 in a central region of the deflection limiter 78. The deflection limiter 78 of FIG. 4 also includes an inner arm 90 (e.g., a linkage, a rod, a stud, a clevis, etc.) and an outer arm 92 (e.g., a linkage, a rod, a stud, a clevis, etc.).

The inner arm 90 projects longitudinally along the longitudinal centerline 80 (e.g., radially inward relative to the axial centerline 30) out from the base 88 to the inner end 82. The inner arm 90 is configured with an inner mounting aperture 94 (e.g., a through-hole, a slot, etc.) that projects transversely through the inner arm 90 along an axis 96 (e.g., a centerline of the aperture 94). The inner mounting aperture 94 has a cross-sectional geometry when viewed, for example, in a plane perpendicular to the aperture axis 96; e.g., the plane of FIG. 4. This cross-sectional geometry of FIG. 4 has an elongated shape; however, in other embodiments, the cross-sectional geometry may have a circular or other shape.

The outer arm 92 projects longitudinally along the longitudinal centerline 80 (e.g., radially outward relative to the axial centerline 30) out from the base 88 to the outer end 84. The outer arm 92 is configured with an outer mounting aperture 98 (e.g., a through-hole, a slot, etc.) that projects transversely through the outer arm 92 along an axis 100 (e.g., a centerline of the aperture 98). The outer mounting aperture 98 has a cross-sectional geometry when viewed, for example, in a plane perpendicular to the aperture axis 100; e.g., the plane of FIG. 4. This cross-sectional geometry of FIG. 4 has an elongated shape; however, in other embodiments, the cross-sectional geometry may have a circular or other shape.

Each deflection limiter 78 may be configured as a fixed length body. Alternatively, one or more or each of the deflection limiters 78 may be configured as a variable length body. The base 88, for example, may be configured as or with a turnbuckle and/or a damper, which damper may include a piston.

Figure 6:
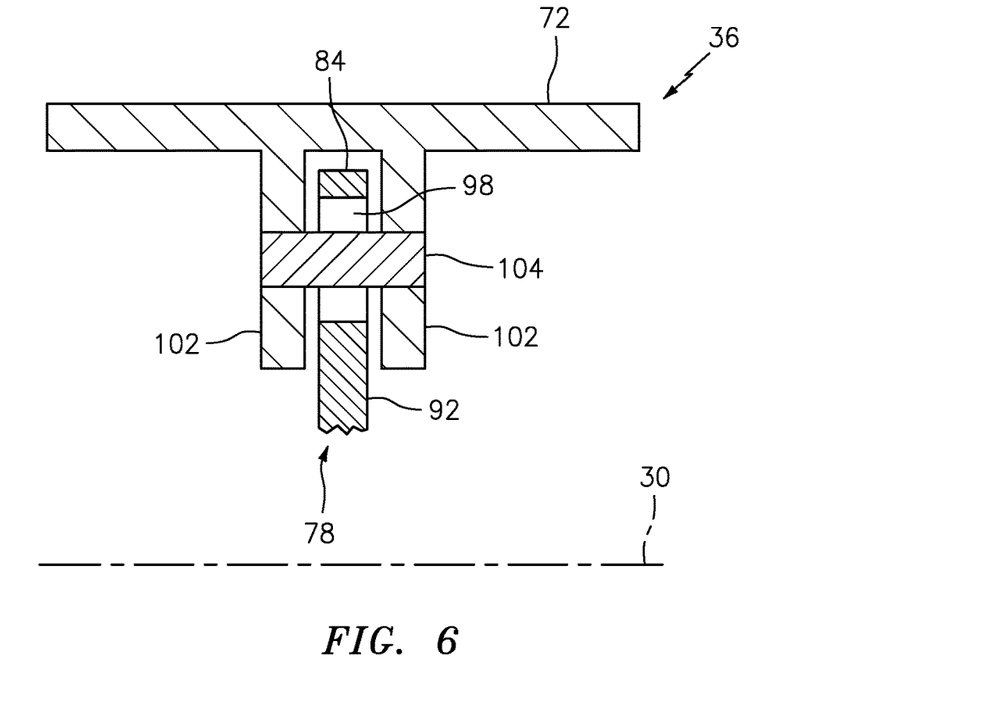
FIG. 6 is a sectional illustration of a connection between the deflection limiter and a core cowl.

Referring to FIG. 6, the deflection limiter 78 is attached to the core cowl 72 at the outer end 84. For example, the outer arm 92 of FIG. 6 is mated with (e.g., positioned between) one or more outer mounts 102 (e.g., flanges, tabs, etc.) of the core cowl 72. At least one outer fastener 104 (e.g., a bolt, a pin, etc.) is mated with (e.g., projects through) the outer mounting aperture 98 to secure the outer arm 92 to the outer mounts 102. In the specific embodiment of FIG. 6, the outer fastener 104 has a smaller (e.g., circular) cross-sectional geometry than the outer mounting aperture 98. The outer fastener 104 is thereby operable to slide laterally (e.g., longitudinally along the longitudinal centerline 80; radially in and outer relative to the axial centerline 30) within the outer mounting aperture 98. Thus, the connection between the deflection limiter 78 and the core cowl 72 is a moveable connection. Of course, in other embodiments, this connection may alternatively be a fixed pivot connection, or a completely fixed connection.

Figure 7:
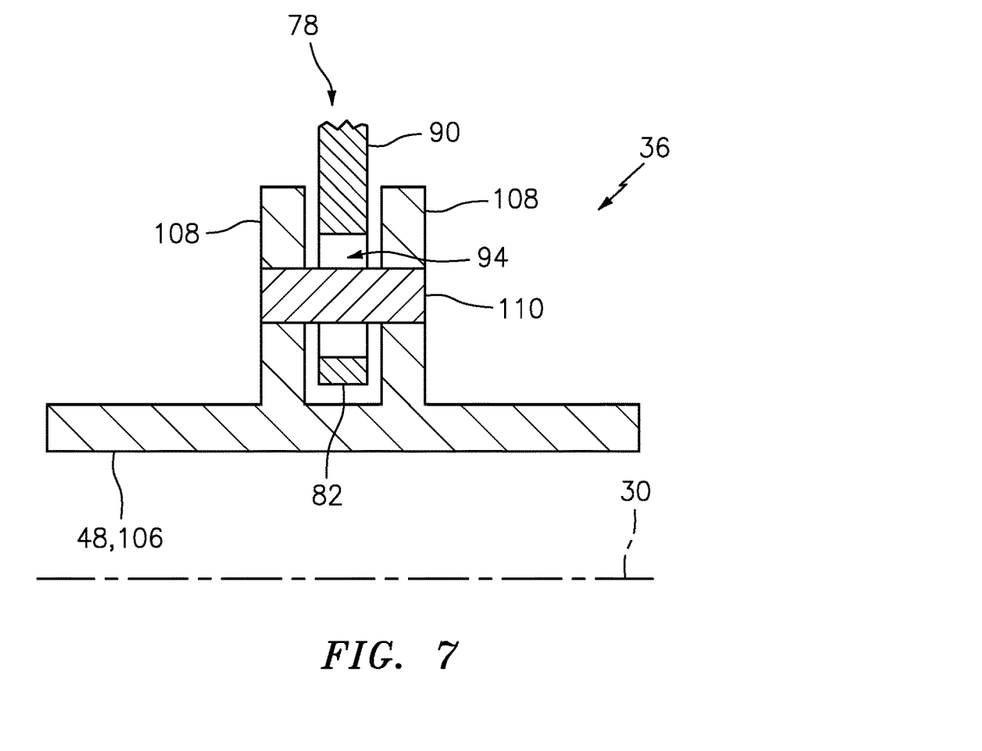
FIG. 7 is a sectional illustration of a connection between the deflection limiter and a fixed structure.

Referring to FIG. 7, the deflection limiter 78 is attached to a fixed structure 106 at the inner end 82. Briefly, the fixed structure 106 is located radially inboard of the core cowl 72; e.g., see FIGS. 3A and 3B. The fixed structure 106, for example, may be configured as or otherwise include the inner case 48 or any other fixed/stationary component of the inner housing structure 36. The inner arm 90 of FIG. 7 is mated with (e.g., positioned between) one or more inner mounts 108 (e.g., flanges, tabs, etc.) of the fixed structure 106. At least one inner fastener 110 (e.g., a bolt, a pin, etc.) is mated with (e.g., projects through) the inner mounting aperture 94 to secure the inner arm 90 to the inner mounts 108. In the specific embodiment of FIG. 7, the inner fastener 110 has a smaller (e.g., circular) cross-sectional geometry than the inner mounting aperture 94. The inner fastener 110 is thereby operable to slide laterally (e.g., longitudinally along the longitudinal centerline 80; radially in and outer relative to the axial centerline 30) within the inner mounting aperture 94. Thus, the connection between the deflection limiter 78 and the fixed structure 106 is a moveable connection. Of course, in other embodiments, this connection may alternatively be a fixed pivot connection, or a completely fixed connection.

Figure 8A:
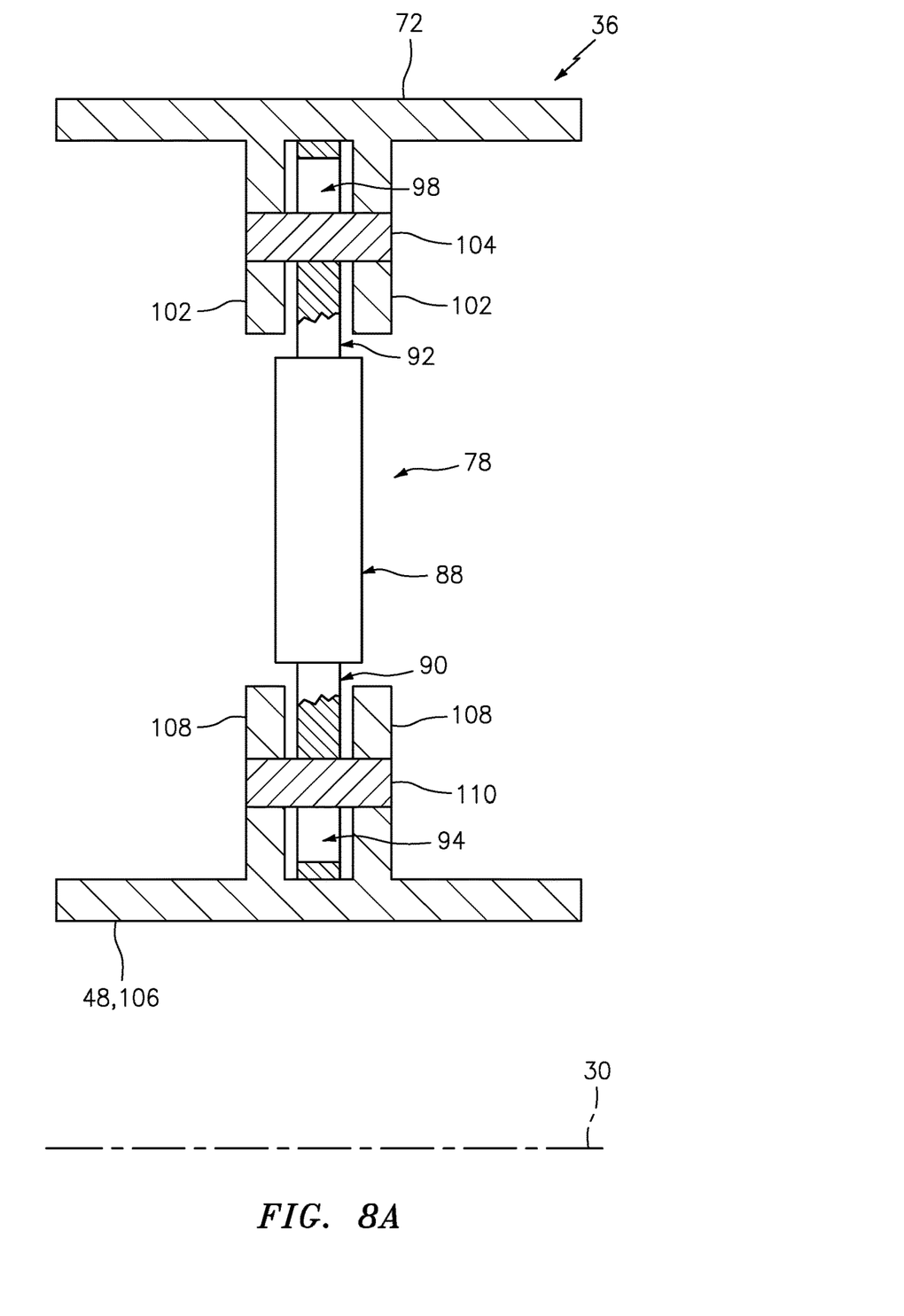
FIG. 8A is a cutaway illustration of portion of the inner housing structure with a deflection limiter at its inner bounds.
Figure 8B:
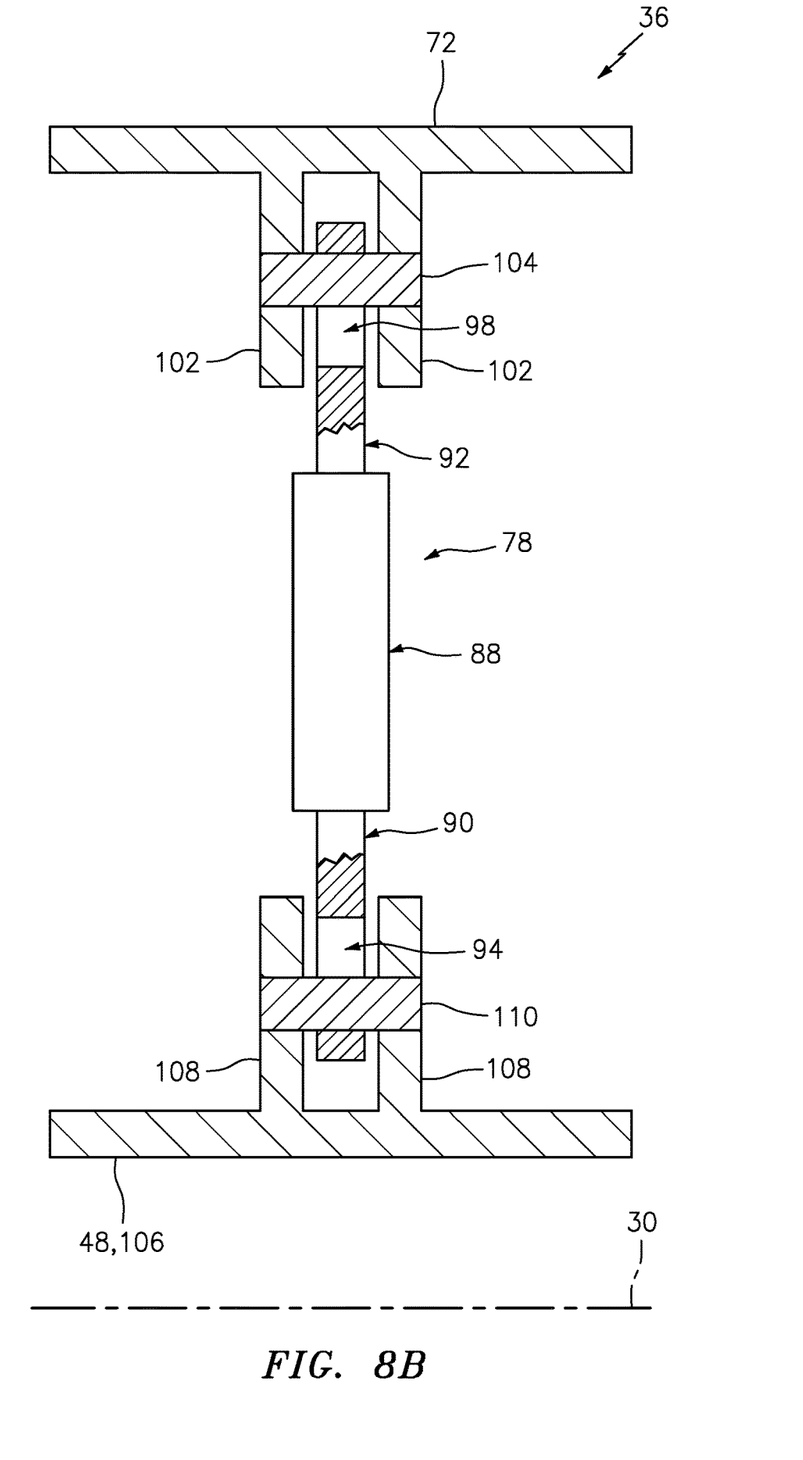
FIG. 8B is a cutaway illustration of portion of the inner housing structure with a deflection limiter at its outer bounds.

The moveable connections and/or the variable length of the deflection limiter 78 enables the core cowl 72 to move as described above. For example, when the core cowl 72 is in the position of FIG. 3A, the fasteners 104 and 110 may be located as shown in FIG. 8A. By contrast, when the core cowl 72 is in the position of FIG. 3B, the fasteners 104 and 110 may be located as shown in FIG. 8B. In addition, where the base 88 is configured as or with a damper, the respective deflection limiter 78 may also damp vibrations and/or radial movements of the core cowl 72 during aircraft propulsion system operation.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
   a nacelle inner structure comprising an internal compartment and a cowl;
   the internal compartment configured to house a core of a gas turbine engine;
   the cowl configured to form an outer radial periphery of the internal compartment, and the cowl further configured to form an outer radial periphery of a compartment exhaust to the internal compartment at an aft end of the cowl;
   a deflection limiter attached to the cowl, the deflection limiter configured to limit radial outward movement of the cowl, the deflection limiter extending radially between an inner end and an outer end, the deflection limiter comprising a mounting aperture at the outer end, and the mounting aperture comprising a slot; and
   a fastener mated with the mounting aperture to attach the deflection limiter to the cowl, and the fastener configured to move laterally within the slot.

2. The assembly of claim 1, wherein the deflection limiter is configured to limit radial outward movement of the cowl at the aft end of the cowl.

3. The assembly of claim 1, wherein the deflection limiter is further configured to enable a predefined amount of radial movement of the cowl.

4. The assembly of claim 1, further comprising:
   the gas turbine engine;
   the deflection limiter attached to and extending radially between the cowl and a case of the core of the gas turbine engine.

5. The assembly of claim 1, wherein the deflection limiter comprises a damper.

6. The assembly of claim 1, wherein the compartment exhaust is configured to direct fluid out of the internal compartment into an environment outside of the nacelle inner structure.

7. The assembly of claim 1, further comprising a core nozzle configured to form an inner radial periphery of the compartment exhaust and to form an outer radial periphery of a core exhaust.

8. The assembly of claim 1, wherein the cowl is further configured to form an inner radial periphery of a bypass flowpath within the aircraft propulsion system.

9. The assembly of claim 1, wherein the deflection limiter comprises a turnbuckle.

10. An assembly for an aircraft propulsion system, comprising:
    a nacelle inner structure comprising an internal compartment and a cowl;
    the internal compartment configured to house a core of a gas turbine engine;
    the cowl configured to form an outer radial periphery of the internal compartment, and the cowl further configured to form an outer radial periphery of a compartment exhaust to the internal compartment at an aft end of the cowl;

a deflection limiter attached to the cowl, the deflection limiter configured to limit radial outward movement of the cowl, the deflection limiter extending radially between an inner end and an outer end, the deflection limiter comprising a slot; and a fastener mated with the slot, the fastener configured to attach the deflection limiter to a fixed structure located radially inboard of the cowl, and the fastener configured to move laterally within the slot.

11. The assembly of claim 10, wherein the deflection limiter comprises a turnbuckle.

12. The assembly of claim 10, wherein the deflection limiter comprises a damper.

13. The assembly of claim 10, wherein the deflection limiter is configured to limit radial outward movement of the cowl at the aft end of the cowl.

14. An assembly for an aircraft propulsion system, comprising:

a nacelle inner structure comprising an internal compartment and a cowl;

the internal compartment configured to house a core of a gas turbine engine;

the cowl configured to form an outer radial periphery of the internal compartment, and the cowl further configured to form an outer radial periphery of a compartment exhaust to the internal compartment at an aft end of the cowl; and a deflection limiter attached to the cowl, the deflection limiter configured to limit radial outward movement of the cowl, and comprising a turnbuckle.

15. The assembly of claim 14, wherein the deflection limiter is configured to limit radial outward movement of the cowl at the aft end of the cowl.

16. The assembly of claim 14, wherein the deflection limiter is configured to enable a predefined amount of radial movement of the cowl.

17. The assembly of claim 14, further comprising:

the gas turbine engine;

the deflection limiter attached to and extending radially between the cowl and a case of the core of the gas turbine engine.

18. The assembly of claim 14, wherein the compartment exhaust is configured to direct fluid out of the internal compartment into an environment outside of the nacelle inner structure.

19. The assembly of claim 14, further comprising a core nozzle configured to form an inner radial periphery of the compartment exhaust and to form an outer radial periphery of a core exhaust.

20. The assembly of claim 14, wherein the cowl is further configured to form an inner radial periphery of a bypass flowpath within the aircraft propulsion system.

* * * * *